(12) United States Patent
Schulte

(10) Patent No.: US 9,336,673 B1
(45) Date of Patent: May 10, 2016

(54) BLUETOOTH WIRELESS ELECTRONIC TETHER

(71) Applicant: Alex Schulte, Mississauga (CA)

(72) Inventor: Alex Schulte, Mississauga (CA)

(*) Notice: Subject to any disclaimer, the term of this patent is extended or adjusted under 35 U.S.C. 154(b) by 0 days.

(21) Appl. No.: 14/480,178

(22) Filed: Sep. 8, 2014

(51) Int. Cl.
*G08B 1/08* (2006.01)
*G08B 21/24* (2006.01)
*G08B 13/22* (2006.01)
*G08B 21/18* (2006.01)
*H04B 7/26* (2006.01)

(52) U.S. Cl.
CPC .............. *G08B 21/24* (2013.01); *G08B 13/22* (2013.01); *G08B 21/182* (2013.01); *H04B 7/26* (2013.01)

(58) Field of Classification Search
CPC ............. G08B 31/1427; G08B 13/14; G08B 21/0202; G08B 21/0247; G08B 21/24; G08B 21/02; G08B 21/0227
USPC .......... 340/571, 568.1, 573.1, 539.1, 539.11, 340/539.13, 539.15, 686.6, 539.21
See application file for complete search history.

(56) References Cited

U.S. PATENT DOCUMENTS

| | | | |
|---|---|---|---|
| 5,801,627 A | 9/1998 | Hartung | |
| 6,011,471 A | 1/2000 | Huang | |
| 7,009,512 B2 | 3/2006 | Cordoba | |
| 7,042,360 B2 | 5/2006 | Light et al. | |
| 8,253,559 B2* | 8/2012 | Howard | G08B 13/1427 340/539.1 |
| 8,253,560 B2* | 8/2012 | Howard | G08B 21/0247 340/539.1 |
| 2003/0063003 A1* | 4/2003 | Bero | G08B 21/0227 340/573.1 |
| 2005/0280546 A1* | 12/2005 | Ganley | G08B 13/1427 340/573.4 |
| 2006/0202840 A1* | 9/2006 | Korbonski | G08B 21/0202 340/573.4 |
| 2008/0106409 A1* | 5/2008 | Schmidt | A44B 15/005 340/568.1 |
| 2008/0266089 A1* | 10/2008 | Haren | G06F 21/88 340/568.1 |
| 2011/0254684 A1* | 10/2011 | Antoci | H04M 1/7253 340/539.13 |
| 2012/0235816 A1* | 9/2012 | Estrada | G08B 13/1427 340/571 |
| 2014/0184412 A1* | 7/2014 | Boudet | G08B 13/14 340/568.1 |
| 2014/0266698 A1* | 9/2014 | Hall | G08B 21/24 340/539.13 |
| 2015/0194031 A1* | 7/2015 | Cutler | G08B 21/02 340/573.1 |

* cited by examiner

*Primary Examiner* — Hoi Lau
(74) *Attorney, Agent, or Firm* — Crossley & Stevenson IP Law

(57) ABSTRACT

A Bluetooth electronic tether device having an on/off switch, an indicator light, a speaker, a battery pack, a Bluetooth wireless interconnection device, a CPU, and an alarm, the indicator light indicating a condition of communication between the Bluetooth wireless interconnection device within the electronic tether unit and an existing Bluetooth equipped mobile device, and a cessation of communication between the device and the existing Bluetooth equipped mobile device initiates the alarm.

1 Claim, 3 Drawing Sheets

BLUETOOTH WIRELESS ELECTRONIC TETHER

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of wireless electronic tethers are known in the prior art. They are known to operate via RFID and other such technologies. The technologies currently utilized pose problems relating to interference, indoor operational difficulties, and power demands. These technologies further often require retrofit of further capabilities to devices for which loss and theft protection is desired. Further, current technologies in use do not automatically, without electronic signal from device to alarm unit, issue alarm. With Bluetooth technology, existing protocols are viable at and up to given distances only. Choice of protocol can determine that distance such that alarm is issued without signal from separated device to alarm unit required to initiate an alarm. What is needed is a wireless electronic tether that utilizes current technology and solves these problems through use of Bluetooth technology.

FIELD OF THE INVENTION

The present invention relates to wireless electronic tethers.

SUMMARY OF THE INVENTION

The general purpose of the Bluetooth wireless electronic tether, described subsequently in greater detail, is to provide a Bluetooth wireless electronic tether that has many novel features that result in a Bluetooth wireless electronic tether which is not anticipated, rendered obvious, suggested, or even implied by prior art, either alone or in combination thereof.

To accomplish this, the Bluetooth electronic tether device comprises an electronic tether unit comprising a top side spaced apart from a bottom side by a perimeter. An on/off switch is disposed on the top side. An indicator light is disposed within the top side. A speaker is disposed within the perimeter. A battery pack is accessibly disposed in the bottom side. A ring is directly attached to and extended from the perimeter and provides for a plurality of existing items such as keys.

A Bluetooth wireless interconnection device is disposed within the unit. A GPS is disposed within the unit. A CPU is disposed within the unit. A distance setting control is disposed within the unit, and an alarm is disposed within the unit.

The on/off switch, the indicator light, the speaker, the battery pack, the Bluetooth wireless interconnection device, the GPS, the CPU, the distance setting control, and the alarm are in operational communication. When the Bluetooth wireless interconnection device is in communication with an existing Bluetooth equipped mobile device, as indicated by the indicator light, the alarm issues through the speaker upon a separation of a preset distance between the mobile device, such as a tablet computer, and the Bluetooth wireless interconnection device within the electronic tether unit. A significant advantage of the device is that no signal need be issued at a preset separation distance. This is an optional feature of the present device. The GPS and distance setting control are optional. Bluetooth wireless interconnection device protocols provide for communication between two Bluetooth wireless interconnection device equipped devices at and up to defined distances. The present device is also designed to use only these protocols, without the above noted options, to automatically initiate alarm upon cessation of communication between the Bluetooth wireless interconnection device within the electronic tether unit and an existing Bluetooth equipped mobile device.

Through alarm, an owner of a misplaced or stolen apparatus is immediately notified and thereby provided a chance for recovery.

Thus has been broadly outlined the more important features of the present Bluetooth wireless electronic tether so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
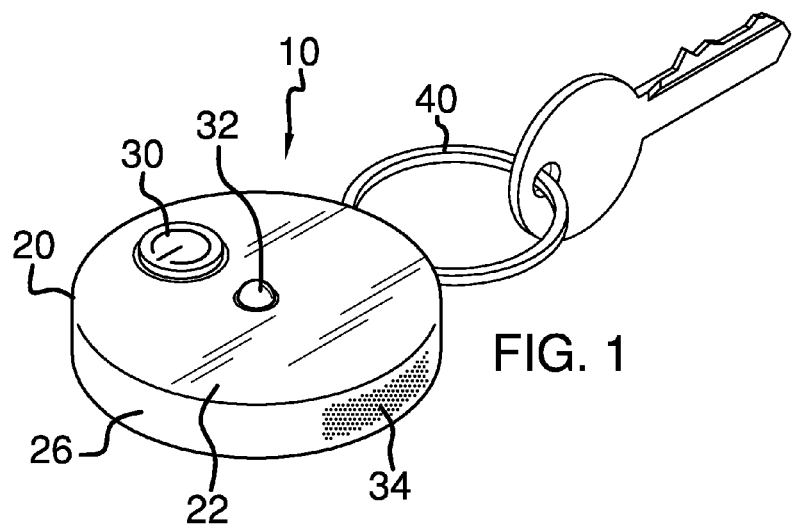
FIG. 1 is a top side perspective view.
Figure 2:
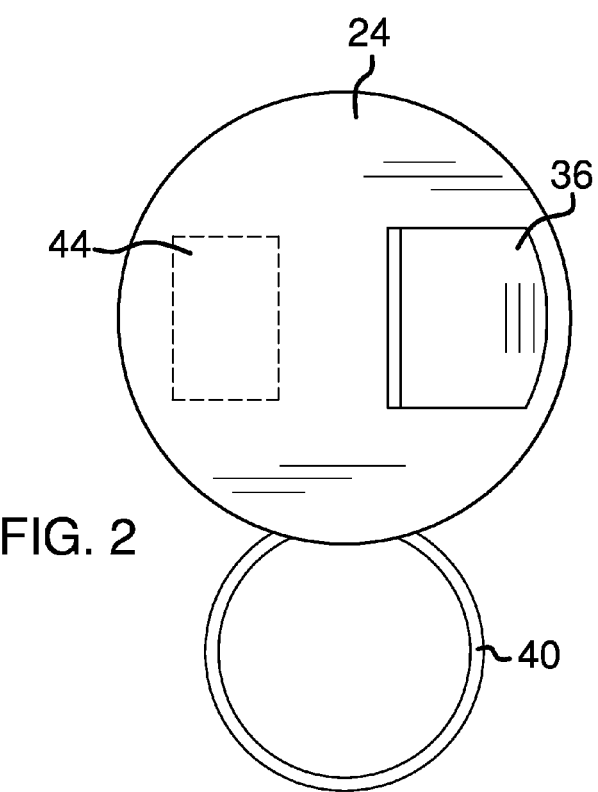
FIG. 2 is a bottom plan view.
Figure 3:
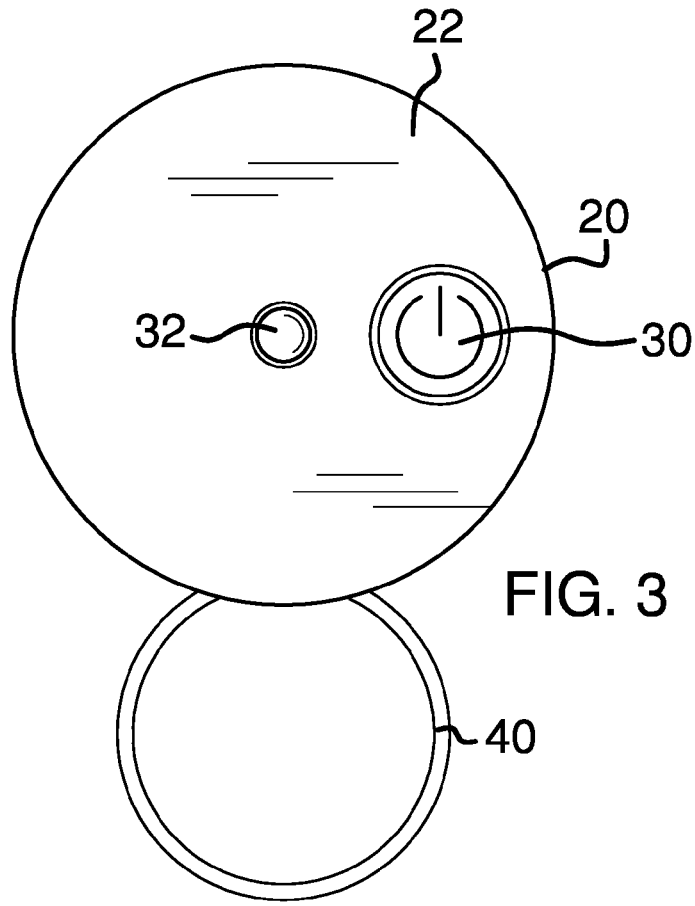
FIG. 3 is a top plan view.
Figure 4:
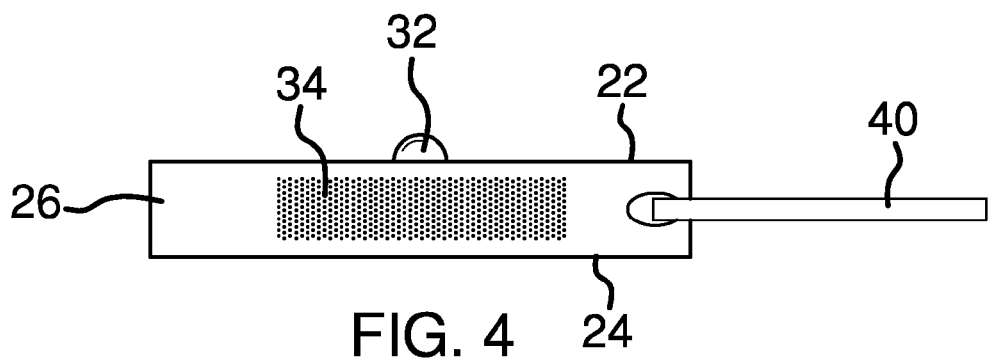
FIG. 4 is a perimeter view.
Figure 5:
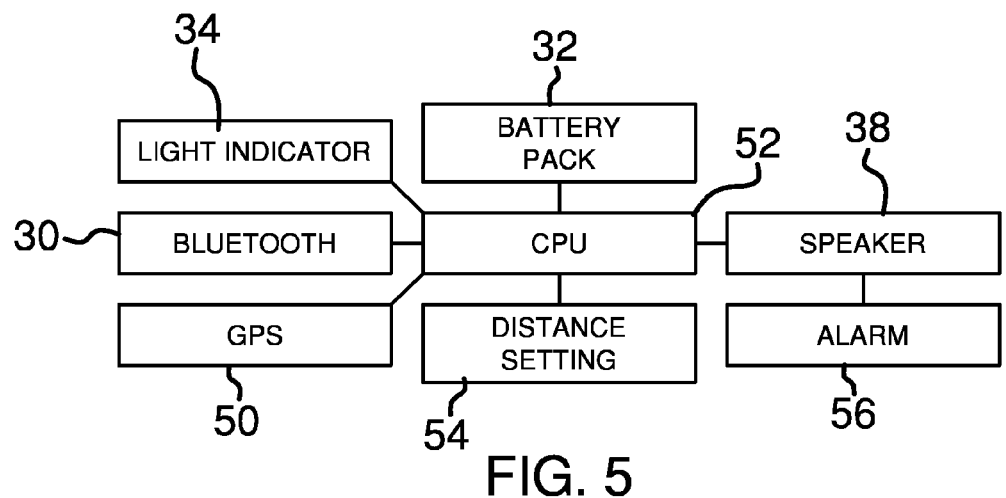
FIG. 5 is a schematic block diagram of a plurality of electronic components.
Figure 6:
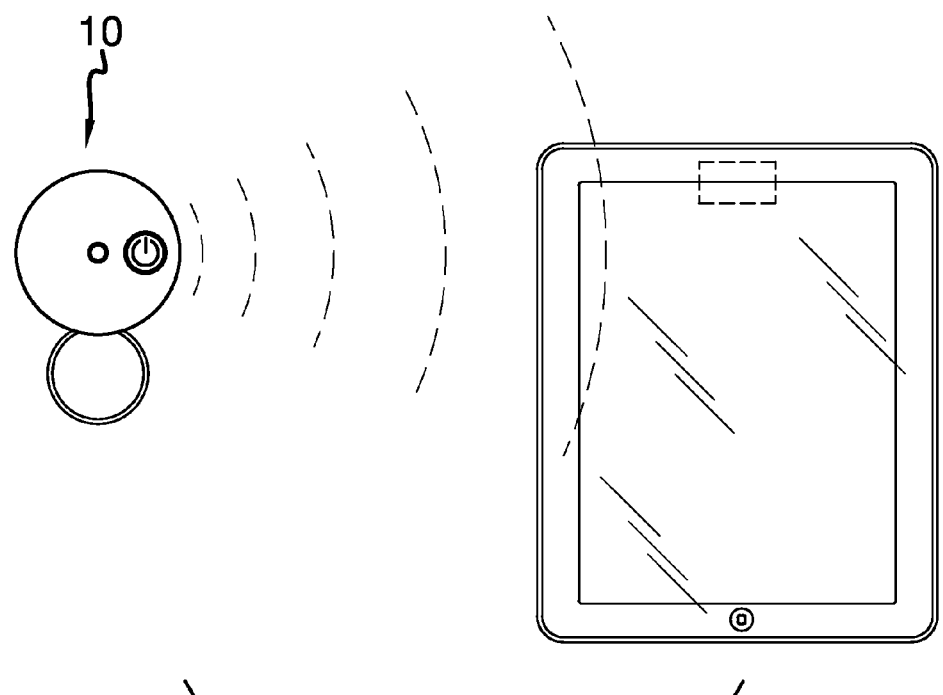
FIG. 6 is an in use view.

With reference now to the drawings, and in particular FIGS. 1 through 6 thereof, an example of the Bluetooth wireless electronic tether employing the principles and concepts of the present Bluetooth wireless electronic tether and generally designated by the reference number 10 will be described.

Referring to FIGS. 1 through 6, the Bluetooth electronic tether device 10 comprises an electronic tether unit 20 comprising a top side 22 spaced apart from a bottom side 24 by a perimeter 26. An on/off switch 30 is disposed on the top side 22. An indicator light 32 is disposed within the top side 22. A speaker 34 is disposed within the perimeter 26. A battery pack 36 is accessibly disposed in the bottom side 24. A ring 40 is directly attached to and extended from the perimeter 26 and provides for a plurality of existing items such as keys.

A Bluetooth wireless interconnection device 44 is disposed within the unit 20. A GPS 50 is disposed within the unit 20. A CPU 52 is disposed within the unit 20. A distance setting control 54 is disposed within the unit 20, and an alarm 56 is disposed within the unit 20.

The on/off switch 30, the indicator light 32, the speaker 34, the battery pack 36, the Bluetooth wireless interconnection device 44, the GPS 50, the CPU 52, the distance setting control 54, and the alarm 56 are in operational communication. When the Bluetooth wireless interconnection device 44 within the electronic tether unit 20 is in communication with an existing Bluetooth equipped mobile device such as a tablet computer, as indicated by the indicator light 32, the alarm 56 issues through the speaker 34 upon a separation of a preset distance between the mobile device and the device 10. Alternately, a significant advantage of the device 10 is that the GPS 50 is not mandatory, nor the distance setting control 54. These are optional inclusions. An advantage of Bluetooth communication between the Bluetooth wireless interconnection device 44 within the electronic tether unit 20 and the existing Bluetooth equipped mobile device is that no signal need be issued at a preset separation distance, as failure of Bluetooth wireless interconnection device 44 communication exists at the given distance and therefore automatically initiates the alarm 56.

What is claimed is:

1. A Bluetooth electronic tether device consisting of:
an electronic tether unit comprising a top side spaced apart from a bottom side by a perimeter;
an on/off switch disposed on the top side;
an indicator light disposed within the top side;
a speaker disposed within the perimeter;
a battery pack accessibly disposed in the bottom side;
a ring directly attached to and extended from the perimeter;
a Bluetooth wireless interconnection device disposed within the unit;
a GPS disposed within the unit;
a CPU disposed within the unit;
a distance setting control disposed within the unit; and
an alarm disposed within the unit;
wherein the on/off switch, the indicator light, the speaker, the battery pack, the Bluetooth wireless interconnection device, the GPS, the CPU, the distance setting control, and the alarm are in operational communication;
wherein the indicator light indicates a condition of communication between the Bluetooth wireless interconnection device within the electronic tether unit and an existing Bluetooth equipped mobile device; and
wherein the alarm is initiated upon a preset distance setting between the Bluetooth wireless interconnection device within the electronic tether unit and the existing Bluetooth equipped mobile device.

\* \* \* \* \*